United States Patent [19]
Kuhn

[11] 3,871,339
[45] Mar. 18, 1975

[54] METHOD OF MAKING A COOLED VALVE FOR HEAT ENGINE AND VALVE OBTAINED THEREBY

[75] Inventor: Karl Walter Kuhn, Saint-Germain-En-Laye, France

[73] Assignee: Societe d'Etudes de Machines Thermiques, Saint-Denis, France

[22] Filed: Sept. 20, 1972

[21] Appl. No.: 290,535

[30] Foreign Application Priority Data
Oct. 27, 1971 France ............................ 71.38596

[52] U.S. Cl... 123/41.41, 123/188 AA, 29/156.7 C, 29/446, 29/474.4, 29/500
[51] Int. Cl. ............................................. F01p 3/14
[58] Field of Search ......... 123/41.41, 188 R, 188 A, 123/188 AA; 29/156.7 C, 446, 474.4, 500, 501

[56] References Cited
UNITED STATES PATENTS

| | | | |
|---|---|---|---|
| 698,474 | 4/1902 | Ebbs .............................. | 123/41.41 |
| 1,186,860 | 6/1916 | Sturtevant...................... | 123/41.41 |
| 1,914,340 | 6/1933 | Holzwarth....................... | 123/41.41 |
| 2,104,503 | 1/1938 | Baker................................. | 29/500 |
| 2,193,088 | 3/1940 | Charlton ..................... | 123/188 AA |
| 2,371,548 | 3/1945 | Saffady........................ | 123/188 AA |
| 2,398,514 | 4/1946 | Bronander ................ | 123/41.41 UX |
| 2,410,190 | 10/1946 | Townhill ..................... | 123/188 AA |
| 2,882,886 | 4/1959 | Butcher, Jr. ................. | 123/188 AA |
| 3,131,470 | 5/1964 | Waller .............................. | 29/474.4 |

FOREIGN PATENTS OR APPLICATIONS

| | | | |
|---|---|---|---|
| 12,450 | 4/1914 | United Kingdom ............ | 123/41.41 |
| 507,748 | 7/1920 | France............................ | 123/41.41 |

OTHER PUBLICATIONS

"Welding and Brazing," Metals Handbook, American Society For Metals, Vol. 6, August, 1971, PP. 657, 658, FIG. 3.

*Primary Examiner*—Richard J. Herbst
*Assistant Examiner*—Dan C. Crane
*Attorney, Agent, or Firm*—Kenyon & Kenyon Reilly Carr & Chapin

[57] ABSTRACT

A water-cooled exhaust valve for an internal combustion engine with a stem formed with coolant inlet and outlet ducts and a head provided with an internal chamber assembled with said stem and with said chamber communicating with said ducts, and to a method for making said valve, said method consisting in screwing the endwise threaded stem into said head provided with an axial threaded bore opening into said chamber, for connecting same together, the mating threads of the stem and bore co-operating with a given relative clearance and locking the head and duct to each other in sealing relationship through brazing by means of a hard-solder filling the gaps of the threaded joint.

2 Claims, 2 Drawing Figures

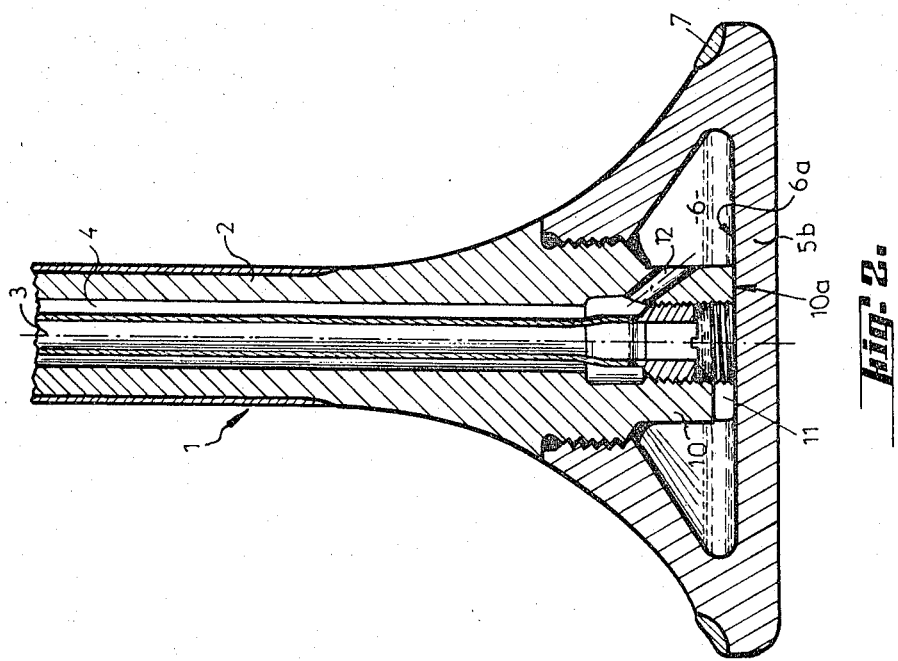
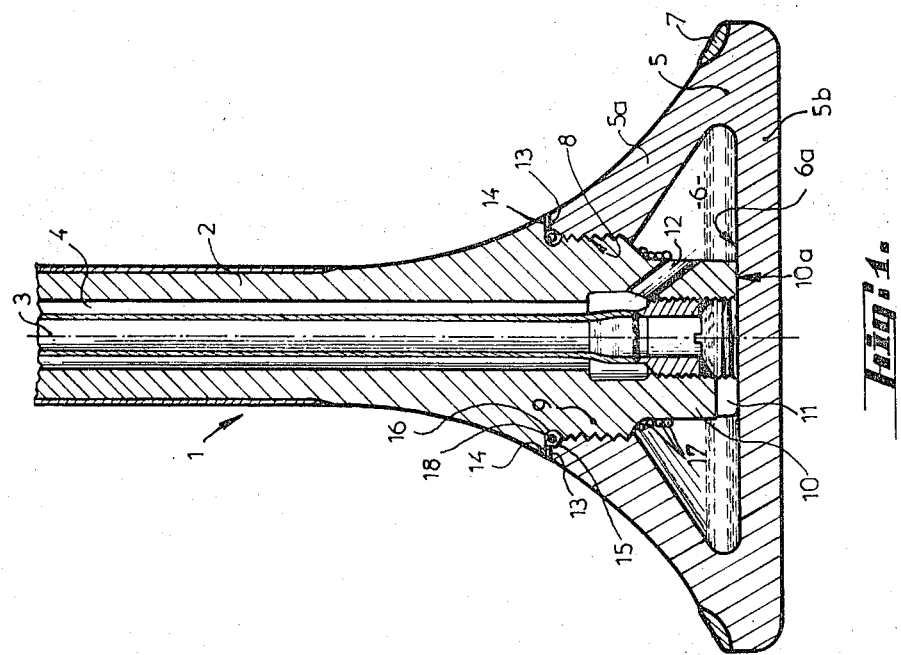

METHOD OF MAKING A COOLED VALVE FOR HEAT ENGINE AND VALVE OBTAINED THEREBY

The present invention relates essentially to a valve member cooled through fluid flow circulation for an internal combustion engine, for instance a DIESEL engine, comprising a stem, spindle or shaft formed inside with fluid coolant inlet and outlet ducts and a head provided with an internal chamber assembled with said stem and with said chamber communicating with said ducts and to the method of manufacturing said valve member.

Presently known valves of this kind exhibit various drawbacks. The junction between head and stem is tricky to be carried out and it is very difficult to achieve and in particular to retain a perfect fluid-tightness; experience has shown that after a longer or shorter period of operation liquid coolant leakages may occur at said junction, which coolant then leaks, spilling into the cylinders and seriously impairs the working of the engine. Moreover due to the very high temperatures reached, in particular with exhaust valves, the valve head which is hollow is quickly deformed or strained and therefore no longer engages its seat with a perfect contact at closing. The various approaches suggested heretofore to improve the fluid-tightness and prevent the deformation of the valve head have proved to be difficult and expensive to be put into practice without so far solving the problems satisfactorily in particular because of the working shocks and high temperatures to which the valve is exposed.

A main object of the present invention is a valve and process for its manufacture, enabling removal of these inconveniences and which process is characterized in that it consists in assembling the head and stem together through screwing by means of a threaded section provided on the periphery of the stem adjacent to one of its ends and of a threaded axial bore provided in the hub portion of the head and opening into said chamber, the threads of said stem portion and head bore co-operating with a given relative clearance, then in locking the head and stem to each other and sealing their junction in fluid-tight relationship through brazing by means of a hard or soft solder which fills the interstices of said junction and in particular the clearance gaps between said threads.

Connecting the head and stem together by screwing is a simple assembling operation whereas the subsequent brazing locks the head and stem together tightly while providing a perfect seal.

The process according to the invention therefore offers the advantage of significantly simplifying the manufacture of valves or valve members cooled through fluid circulation and removes any hazard of unlocking or loosening and leakage even after a very long operation time under the hardest conditions.

According to a further characterizing feature of the process according to the invention, the brazing step is carried out by placing on the stem and/or within the head near said threads hard or soft soldering rings and then after screwing the head and stem provided with said rings onto each other, the valve is subjected to a local heat treatment so as to cause fusion or melting of the solder and its penetration through capillarity and/or gravity effect into the clearance gaps of said junction. For this purpose the valve is desirably positioned vertically with the head directed upwards or located at the top.

The soldering material for instance used in the shape of rings may be easily positioned in the head and/or on the stem prior to assembling; it is then fused or melted by merely supplying heat to the mounted valve; in other terms the method calls for particularly simple means and only requires the least number of operating steps and a very small expenditure of labour time or workmanship.

According to a further characterizing feature of the invention, the heating of the valve is effected through induction.

The induction heating offers the advantage of providing quick heating in depth i.e. in the thread areas where the rings of soldering material are located.

According to another characterizing feature of the method according to the invention, when assembling the head and stem together through screwing, a clamping pre-stress directed axially of the stem is applied onto the inner face of said chamber corresponding to the head disk and in the central area of this face. Such a pre-stress exerted upon the valve head disk prevents its deformation or strain through repeated bendings or flexures while enabling the same to withstand high pulsating pressures to which the valve is subjected.

The invention relates also to a valve cooled through fluid circulation and obtained from said process, said valve being characterized in that its stem is formed near one of its ends with a threaded section whereas the head is formed in its hub portion with an axial threaded bore opening into said chamber and adapted to receive said threaded section in engaging relationship, the threads of said head bore and stem section, respectively, leaving, upon engagement with each other, a given clearance therebetween and said head and stem being rigidly locked together through brazing by means of a hard or soft soldering material which fills the interstices of their junction and in particular the clearance gaps left between said threads.

The invention will be better understood and further objects, details, characterizing features and advantages thereof will appear more clearly as the following description proceeds with reference to the accompanying drawings given by way of example only illustrating a presently preferred form of embodiment thereof and wherein:

FIG. 1 is a partially sectional view of a valve according to the invention during manufacture thereof prior to the brazing step; and FIG. 2 is a view similar to FIG. 1 but showing the finished valve member.

According to the embodiment shown in the accompanying drawings, the valve member according to the invention, for instance an exhaust valve for a Diesel engine generally denoted by the reference numeral 1 essentially comprises a stem 2 formed inside thereof with a pair of concentric ducts 3 and 4 connected to a coolant fluid flow circuit (not shown) and a head 5 assembled with said stem and provided internally with a chamber 6.

With the reference numeral 7 is denoted the annular bearing surface engageable in fluid-tight relationship upon closing of the valve with a seat provided in the cylinder head (not shown).

The head 5 is provided in its hub or collar portion 5a with an axial threaded bore 8 which opens into the chamber 6 and wherein a threaded section 9 of the stem 2 is to be screwed. Both corresponding or mating threads of the bore 8 and of the stem section 9, respectively, while having the same pitch, are however not exactly complementary of each other and purposely leave some clearance therebetween. The stem 2 is provided beyond its threaded section 9 with an extension 10 of a diameter substantially smaller than that of said section so as to be able to extend through the bore 8 and into the chamber 6. The extension 10 is formed with one or several for example 4 passageways such as 11 and 12 extending therethrough and making the ducts 3 and 4, respectively, communicate with the chamber 6. Moreover the extension 10 is of such a length that when the stem is fully screwed into the head i.e. before the end face 13 of the head comes in bearing engagement with the stem shoulder 14, its end 10a is pressed against that flat face 6 a of chamber 6 which corresponds to the disk 5b of head 5. This extension enables thus clamping of the stem against the head and applies onto the disk 5b an adjustable pre-stress since the latter is dependent upon the extent of screwing in. There is also provided adjacent to the head end face 13 and to the stem shoulder 14 grooves 15 and 16, respectively, adapted to receive the soldering material.

Fastening the head and stem together is carried out in the following manner. Rings of soldering material such as 17 and 18 are slipped onto the stem extension 10 and positioned into the groove 15 of the head (or into the groove 16 of the stem) prior to assembling the same. The stem is then screwed into the head until the end 10a of its extension 10 comes into bearing engagement with the face 6a of the cavity 6 thereby providing a sufficient tightening or clamping pressure to be exerted upon the disk 5b and thus a pre-stress preventing any later deformation or strain thereof under the action of high pressures which it undergoes in operation.

The head and stem being thus connected to each other through screwing and the head being clamped with its bottom against the stem, the valve member is locally subjected to heat for instance via an induction heating process so as to cause fusion or melting of the soldering material which flows through capillarity into the interstices left between the head and stem i.e. the clearance gaps left between the threads of the axial bore 8 and of the stem section 9, respectively, as well as into the interstice between the end face 13 and the shoulder 14. After having cooled down, the valve member exhibits the appearance shown in FIG. 2 i.e. the head and stem have been tightly and rigidly connected to each other and definitely locked in sealing relationship by the soldering material entirely filling the clearance gaps.

The clearance between the threads may be experimentally set and it is essentially depending upon the fluidity of the soldering material i.e. upon its nature and the temperature reached during melting. Said prestress should also be previously determined to prevent any separation, lifting off or disengagement of the bottom through thermal deformation (such a disengagement being likely to give rise to beatings of the head bottom against the stem and to cause erosions through cavitation due to the cooling fluid).

It is seen that the product and process according to the invention enables the obtention very simply and economically of a valve cooled through fluid circulation, consisting of two elements tightly connected to each other in perfectly sealing relationship and the head of which is substantially insensitive to or unaffected by deformations owing to the clamping effect.

Instead of induction heating any other suitable local heating mode such as in particular blowpipe or torch heating could also be used.

It should be understood that the invention is not at all limited to the form of embodiment described and shown which has been given by way of example only. In particular it comprises all the means forming technical equivalents to the means described as well as their combinations if same are carried out according to the gist of the invention.

What is claimed is:

1. A built-up fluid-cooled poppet valve member construction comprising: a one-piece hollow mushroom head and a stem of substantially round rod-like configuration throughout its length connected in sealing relationship to and projecting endwise from said head; said head including on one side a substantially flat end wall coaxial with and extending substantially transversely of the longitudinal axis of said stem and on the other side a reduced central hub portion coaxial with said stem and terminating in a substantially flat end face parallel to and of smaller extent than said end wall; said head having an inner chamber closed by said end wall and having a threaded bore located opposite to said end wall in coaxial relation with said stem and extending through said hub portion to open into said chamber and to the outside, respectively; said stem having near one end thereof towards said head a peripheral, annular, radially outward projecting flange-like shoulder and an adjacent intermediate threaded section extending from said shoulder towards said one end over a length corresponding substantially to the axial length of said threaded bore; said stem terminating at said one end in a substantially flat transverse end face and also having a coaxial longitudinal bore extending at said one end to and being open at said transverse end face, a tubular pipe element of smaller diameter than said bore and enclosed therein, said element being substantially coextensive with and disposed in radially spaced relationship with respect to said longitudinal bore thereby defining a pair of cooling fluid conveying concentric ducts, one of which is annular, said pipe element ending recessed axially from adjacent to and being secured directly in sealing relationship to said one end of said longitudinal bore to close off the annular one of said concentric ducts while opening endwise into said one end of said longitudinal bore; said stem extending in screw-threaded engaging relationship through said threaded bore of said hub portion to project bodily into said chamber with said one end abutting endwise with its said flat end face with axially directed thrust pressure contact against said end wall of said head for supporting and backing the latter, and thereby defining an annular cavity within said chamber, said shoulder then bearing against said end face of said hub portion; said stem having adjacent said one end thereof a first port-like passageway providing communication between said chamber and said annular duct and having a second port-like passageway providing direct communication between said chamber and said tubular pipe element via the open end of said longitudinal bore, thereby respectively defining a fluid feed duct and a fluid return duct; at least one of said head and stem having groove means adjacent said shoulder and the corresponding end of said threaded bore; brazing solder material tightly locking said head and stem together, said brazing-solder material filling all the interstices of junctions between said head and stem and in particular in said groove means and any clearance gaps left between the intermeshing threads of said head and stem, thereby bonding the latter to each other and sealing off the connections therebetween.

2. That improvement in the process of making a valve for an internal combustion engine adapted to be cooled by fluid circulation and comprising a valve stem having fluid intake and discharge ducts and a head having an internal chamber communicating with said ducts, said stem having near one end thereof a pheripheral annular outwardly projecting shoulder, and an externally threaded portion extending from said shoulder toward said end, said stem also having a smooth portion of reduced diameter extending from said threaded portion and terminating at said end in a substantially flat end face, and said head having a substantially flat inner face, said head also having a hub portion provided with an internally threaded axially extending bore spaced from said flat inner face, said threaded portion and said threaded bore having threads of like pitch while not being entirely complementary to provide clearance therebetween when screwed together, and a groove provided at the location of intended juncture between the hub portion of the head and said shoulder, the steps comprising applying ring-like brazing material to the stem adjacent said shoulder and applying additional ring-like brazing material to said portion of reduced diameter, screwing the threaded portion of said stem into said threaded bore of said head portion until the flat end face of said stem end is compressively applied against said flat inner face of said head at which time said shoulder substantially abuts said hub, positioning the assembled head and stem portion so that said head is uppermost and during maintenance of said positioning applying localized heat to the assembly in the region of the threaded interengagement at sufficient temperature to melt said brazing material and permit its penetration by gravity and capillary action into interstices in the joined threaded portion of such stem and threaded bore and into said groove, and thereafter permitting the molten brazing material to solidify, thereby locking the assembled head and stem together as well as providing leakproof sealing at their juncture.

* * * * *